Aug. 6, 1940.  H. I. MORRIS  2,209,995
APPARATUS FOR CUTTING METAL INTO SECTIONS
Filed March 11, 1937  4 Sheets-Sheet 4
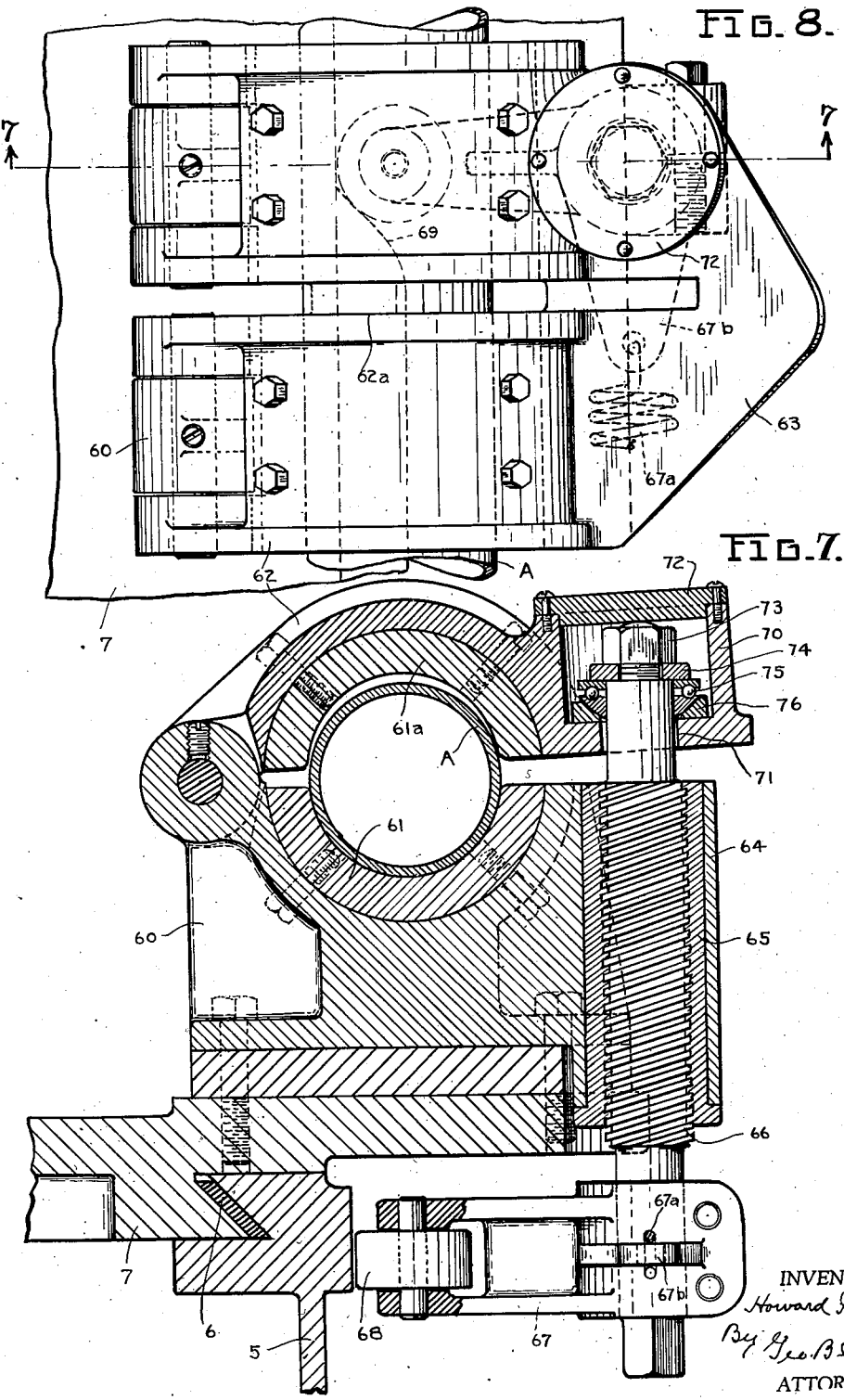
INVENTOR.
Howard I. Morris
By Geo. B. Pitts
ATTORNEY Patented Aug. 6, 1940

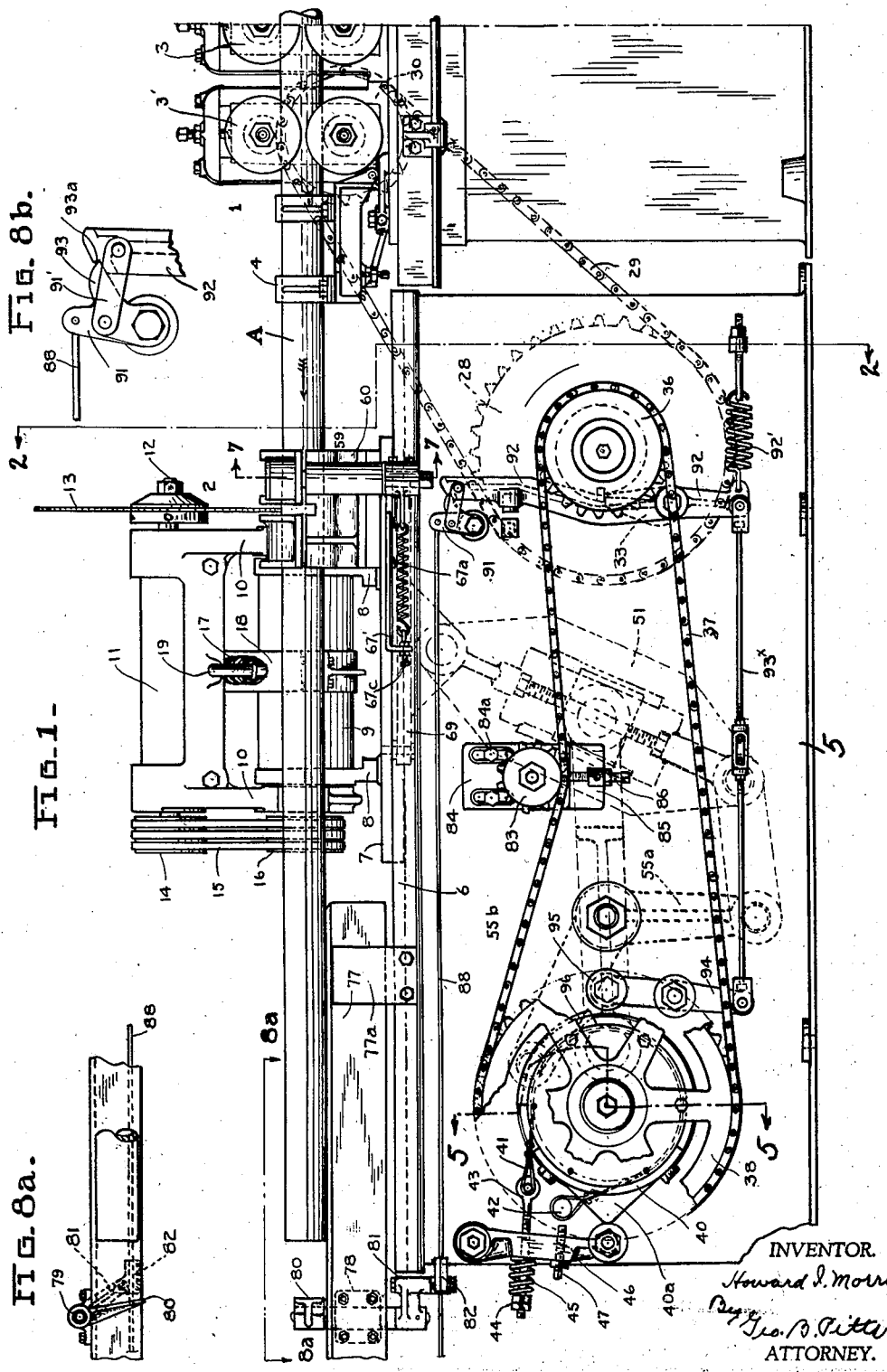

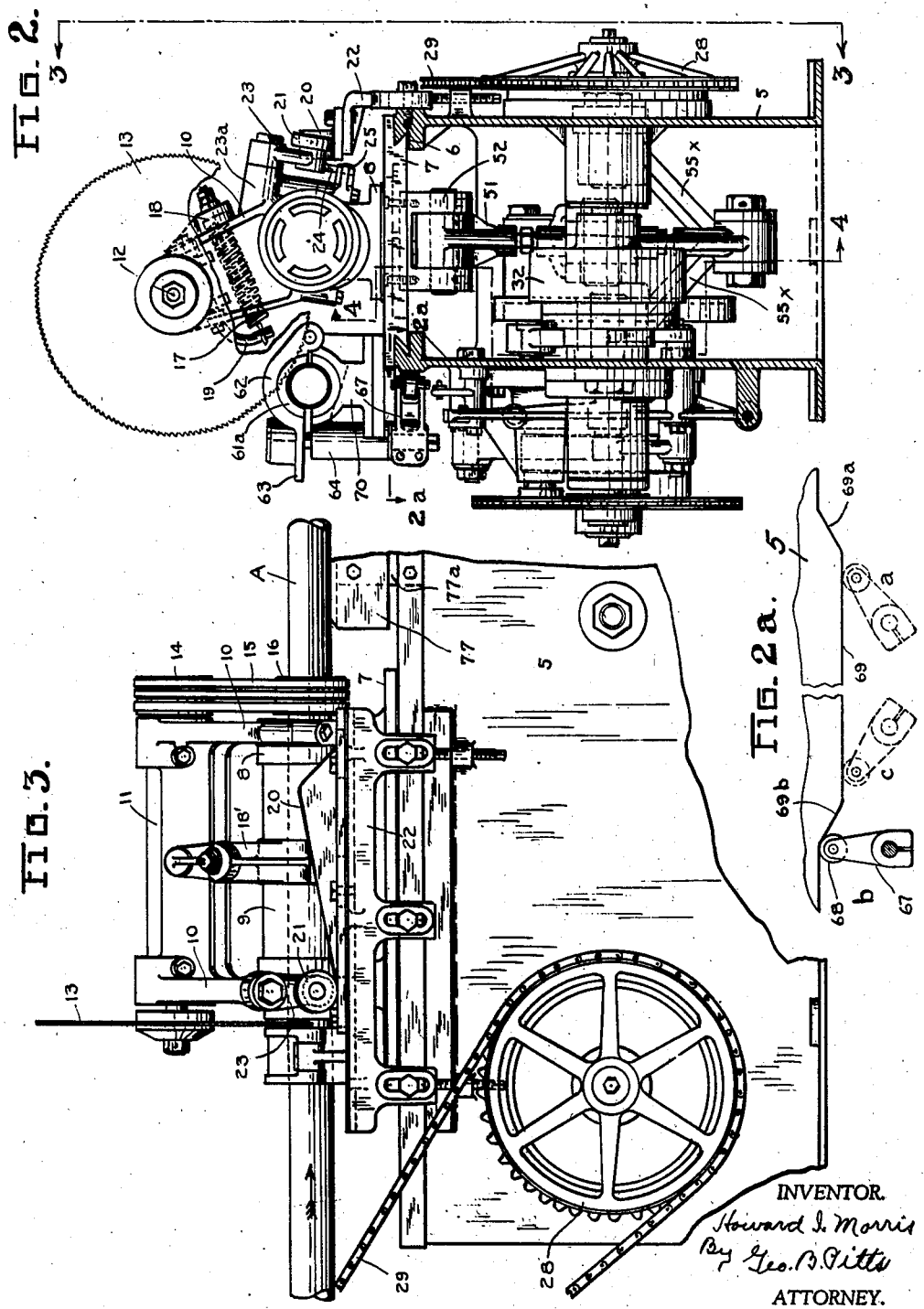

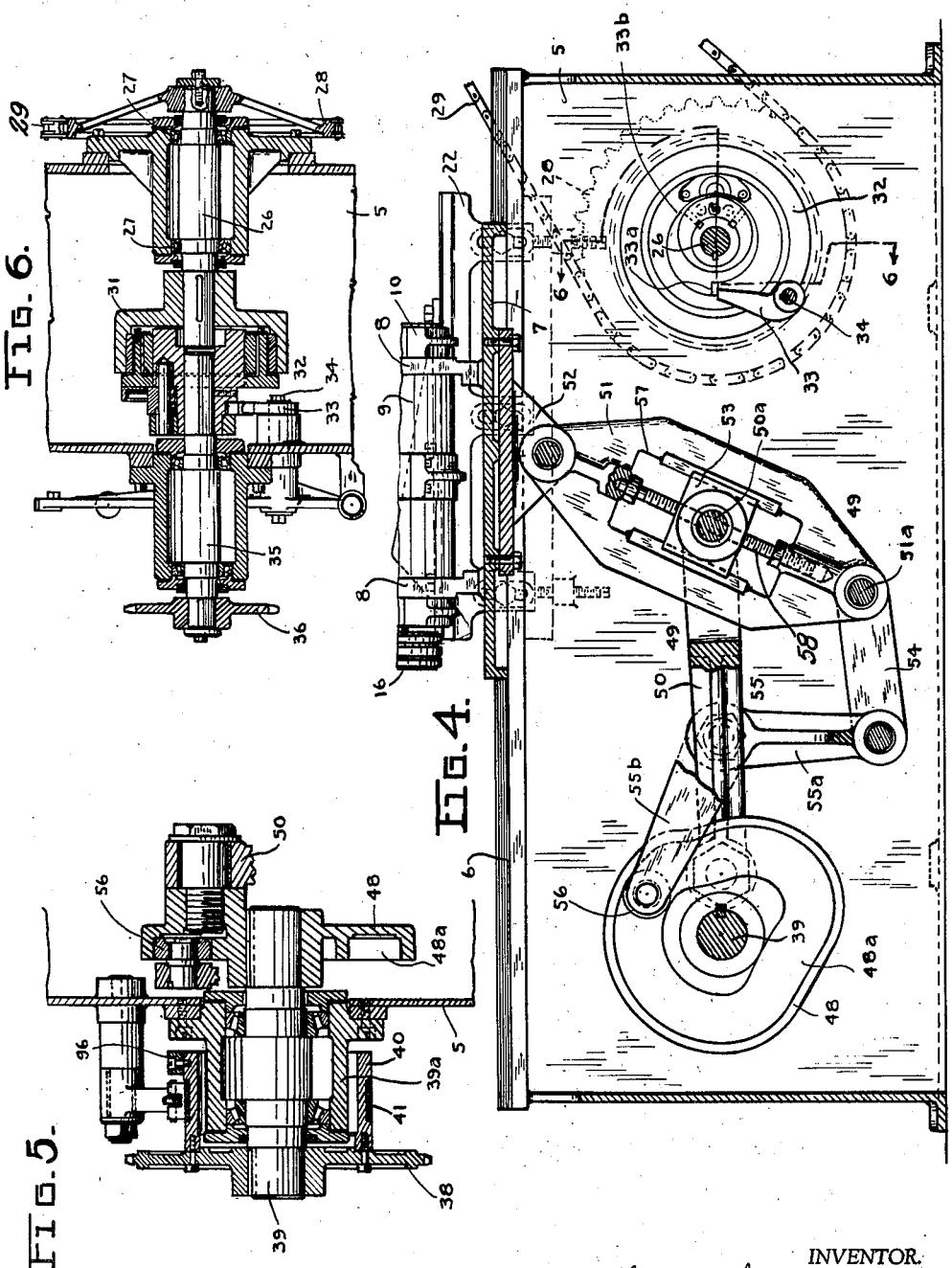

2,209,995

UNITED STATES PATENT OFFICE 2,209,995

APPARATUS FOR CUTTING METAL INTO SECTIONS

Howard I. Morris, Lakewood, Ohio, assignor to The Yoder Company, Cleveland, Ohio, a corporation of Ohio Application March 11, 1937, Serial No. 130,322

8 Claims. (Cl. 29—69)

This invention relates to a machine for automatically cutting material into predetermined lengths, more particularly a machine adapted to be related to a continuously operating material forming machine and operated conjointly therewith so that the formed material is continuously supplied and while in movement may be cut into lengths and discharged to avoid re-handling and permit ready stacking. For purposes of illustration, the formed material is shown as consisting of a pipe which may be of any desired diameter, but in the use of the term pipe it is for purposes of description and not as a limitation of the invention.

One object of the invention is to provide an improved machine of this character wherein provision is made to maintain a constant speed between the cut-off mechanism and the formed material.

Another object of the invention is to provide an improved machine of this character wherein adjustable mechanism is provided for synchronizing the movement of the cut-off mechanism with differing speeds of the formed material, whereby the latter may be accurately cut into predetermined lengths.

Another object of the invention is to provide an improved machine of this type wherein the cut-off mechanism is arranged to move with the material and automatically connect itself to the formed material and automatically disconnect itself therefrom.

Another object of the invention is to provide an improved machine for cutting material into predetermined lengths wherein provision is made to automatically compensate for any difference in the speed of the material and that of the support for the cut-off without stopping the movement of the material, the cut-off or the support for the latter.

Other objects of the invention will be apparent to those skilled in the art to which my invention relates from the following description taken in connection with the accompanying drawings, wherein Fig. 1 is a side elevation showing a portion of a pipe forming apparatus and a machine embodying my invention.

Fig. 2 is a section on the line 2—2 of Fig. 1.

Fig. 2a is a fragmentary section on the line 2a—2a of Fig. 2.

Fig. 3 is a fragmentary side elevation looking at parts from the remote side of Fig. 1, on the line 3—3 of Fig. 2.

Fig. 4 is a fragmentary section on the line 4—4 of Fig. 2.

Fig. 5 is a fragmentary section on the line 5—5 of Fig. 1.

Fig. 6 is a fragmentary section on the line 6—6 of Fig. 4.

Fig. 7 is a section on the line 7—7 of Fig. 8.

Fig. 8 is a plan view of parts shown in Fig. 7.

Fig. 8a is a fragmentary plan view on the line 8a—8a of Fig. 1.

Fig. 8b is a detail view of parts shown in Fig. 1, enlarged.

In the drawings, 1 indicates a portion of a machine for continuously forming material into a predetermined cross sectional shape for delivery to a cut-off mechanism indicated as an entirety at 2. The pre-formed material herein chosen for illustration consists of pipe A which is fed forwardly by one or more pairs of feed rolls 3, 3', to and through a mechanism 4 which may be of a type to size the pipe, to reduce its diameter or to eliminate any tendency of the pipe to spring laterally; also, the pipe as delivered may be of any desired form, that is, its edges may be connected (welded or interlocked) or lapped or related edge to edge ready for welding.

Of the cut-off machine 2, 5 indicates a suitable frame having guides 6 for a slide 7 on which are mounted standards 8. The standards 8 support the opposite ends of an electric motor 9. The end walls of the motor casing are machined to form bearings for the inner ends of arms 10 formed integrally with a housing 11, whereby the latter may swing about an axis, preferably the axis of the motor shaft. The housing 11 is formed with suitable bearings for a shaft 12, on one end of which is mounted a saw or cutter 13 and on the other end of which is a power element 14, such as a pulley or sprocket for an endless device 15 arranged to engage a like power element 16 on the extended end of the motor shaft, whereby the cutter is driven at any desired speed. The housing 11 and parts carried thereby are normally held in an inoperative position by a spring 17 fixed at one end to an arm 18 mounted on the motor casing and connected at its other end to a hook or like device 19 carried by the housing 11, the arm 18 having an extension 18' (see Fig. 3) to limit the movement of the housing 11 under the influence of the spring 17. Movement of the housing in the opposite direction, which movement serves to cause engagement of the cutter with the material to sever a predetermined length thereof from the remaining portion as the material feeds forwardly, is effected by means of a cam and cam engaging element which co-act in the movement of the slide 7 as it moves with the material A, as later set forth. The cam and element are mounted on the frame 5 and one of the arms 10, respectively, as shown in Figs. 2 and 3; the cam being indicated at 20 and the engaging element (which may consist of a roller) being indicated at 21. The cam 20 is suitably fixed to a plate 22 which in turn is adjustably mounted on the adjacent side wall of the frame 5 for vertical adjustment as shown in Figs. 2 and 3, whereby the cam 20 may be raised or lowered to vary the movement of the housing and cutter according to the width or diameter of the material to be cut. The roller 21 is mounted on the outer end of an arm 23, its inner end having a hub loosely mounted on a stud shaft supported on the extended wall 23a of the adjacent arm 10. The arm 23 is provided with a lug 24 which engages with an abutment 25 to hold the arm against swinging movement during engagement of the roller 21 with the cam 20 in the forward movement of the slide 7, the arm being free to swing in the opposite direction to ride the cam 20 in the return movement of the slide 7.

The slide 7 is reciprocated in the guides 6, that is, moved with the material a predetermined distance and then returned or moved back to its starting position by the following mechanism: 26 indicates a shaft mounted in suitable bearings 27 and carrying at its outer end a sprocket 28 engaged by a chain 29, which is continuously driven by a sprocket 30 preferably fixed to the shaft for one of the rolls 3', the latter as well as other parts of the mechanism I being driven by suitable means (not shown). The driving connection with one driven element of the forming machine enables the movement of the slide 7 to be synchronized with the movement of the material A. The inner end of the shaft 26 is connected to one element 31 of a one-revolution clutch 32, which is stopped and released by a dog 33, fixed to a rock shaft 34, supported on the frame 5 (see Fig. 6) and operated in the manner later set forth. The clutch 32 may be of any well-known construction. The driven element of the clutch 32 is fixed to a shaft 35, preferably mounted similarly to the shaft 26 and carrying on its outer end a sprocket 36. The sprocket 36 is engaged by a chain 37 which engages a sprocket 38 on a shaft 39 to drive the latter. The gear ratio between the sprocket 36 and sprocket 38 is such that the former makes two revolutions to one of the sprocket 38, but this ratio may be changed if desired. The shaft 39 is mounted in suitable bearings supported in a sleeve or shell 39a, which is mounted on the adjacent portion of the frame 5. The sprocket 38 has fixed to it a brake drum 40, engaged by a band 41, one end of which is fixed to a pin 42 projecting from the adjacent side of the frame 5. The opposite end of the band is connected to a rod 43 having an adjustable head 44 (preferably consisting of nuts threaded on the outer end of the rod 43) which serves as an abutment for one end of a coiled spring 45, the other end of the spring normally bearing against a link 46 suitable pivoted at one end, so that when its opposite end is swung outwardly the link operates through the spring to yieldingly apply the brake band 41 to the drum 40. The link 46 is operated and controlled to apply and release the brake band 41 by a cam 40a on the drum 40, as later set forth. The movement of the link 46 under the influence of the spring 45 is limited by a suitable stop, which may consist of the pin 42. A screw 47 is threaded through an opening in the link 46 in position to engage the pin 42, to provide an adjustable relation between the link and the stop. Fixed to the inner end of the shaft 39 is a disk 48 which through a mechanism, indicated as an entirety at 49, connected to the slide 7, operates to move the latter throughout its movement in either direction at substantially a constant speed, the elements of the mechanism 49 being so connected to the disk 48 and each other that the speed of the slide throughout its forward movement is equal to that of the pipe A. The mechanism 49 preferably consists of a compound linkage comprising the following: 50 indicates a main drive link pivoted at one end to one side of the disk 48 eccentrically of its axis, the opposite side of the disk being formed with a continuous, irregular shaped cam groove 48a for a purpose later set forth. The opposite end of the link 50 is pivoted to a pitman 51, the latter being pivotally connected at its outer end to a yoke 52 fixed to the bottom of the slide 7. The end of the link 50 that is pivotally connected to the pitman 51 is bifurcated so as to straddle the latter, the bifurcated ends engaging pivot pins 50a which project from the opposite sides of a block 53 adjustably mounted on the pitman 51, as later set forth, whereby the connection between the link 50 and pitman 51 may be varied to increase or decrease the rate of movement of the pitman in accordance with the rate of movement of the pipe A. The inner end of the pitman 51 is pivotally connected at 51a to one end of a link 54. The opposite end of the link 54 is pivotally connected to one arm 55a of a lever 55, which is fulcrumed on the frame 5, its other arm 55b having at its free end a lateral projection, such as a stud shaft loosely supporting a roller 56 which traverses the cam groove 48a as the disk 48 rotates, to operate the lever about its fulcrum. As shown in Fig. 4, the cam groove is irregular in shape, the effect of which is to vary the movement of the lever 55 and thus control the pitman 51 during its movement by the drive link 50. As shown in Fig. 2, the lever arm 55a consists of diverging portions 55x to provide a pivotal support for the lever on the side walls of the frame 5, whereas the arm 55b is formed integral with one of said lever portions for providing an operative driving connection with the disk 48 as above set forth. From the foregoing description it will be seen that the link 50 serves to swing the pitman 51 about the pivot 51a, whereas the lever arm 55a, which is operated simultaneously with the link 50, and link 54 serve to change the position of the pivot 51a with respect to the axis of the pivot pins 50a between the link 50 and pitman 51, the movement of the arm 55a about its fulcrum being controlled by the irregular shape of the cam groove 48a in cooperative relation with the movement of the link 50 and the movement of the outer end of the pitman in and through a fixed plane, due to the guided movement of the slide 7, so that the conjointly related forces operate to swing the pitman and cause its outer end to move at a constant rate of speed throughout its travel in either direction along the plane determined by the guides 6. Due to the fact that the outer end of the pitman 51 is fixed to the slide 7, which is guided, and accordingly moves in a fixed plane, the pitman 51 has both a swinging movement, and a bodily movement which movements are provided for and permitted by the link 54 and pivotal connections between the parts above referred to. The pitman 51 is formed intermediate its ends with a longitudinal opening 57 the side walls of which form guides for the block 53 when the latter is adjusted. The block 53 is moved endwise of the opening 57 by a screw 58, which is threaded through an opening formed in the block and rotatably supported at its opposite ends against endwise movement in the end walls of the opening, so that by rotating the screw 58 the block 53 may be adjusted in either direction, the effect of which is to increase or decrease the rate of movement of the slide 7, according to the direction of adjustment of the block, while maintaining its speed constant or uniform.

59 indicates as an entirety means for automatically clamping the slide 7 to the work A and automatically releasing it from the work in the forward movement thereof; the clamping being effected substantially at the start of the slide in its forward movement and the release being effected as the slide approaches the end of its forward movement. Of these clamping and releasing means 59, 60 indicates a standard suitably supported on the slide 7 (see Fig. 7) and carrying at its upper end clamping jaws shaped in cross section to engage the work A, the lower jaw 61 being fixed to the standard 60 and the upper jaw 61a being secured to an arm 62 which is pivoted at its inner end on the standard 60. In the illustrated construction the jaws are substantially semi-circular and arranged to receive between them the work A as it is fed forwardly by the rolls 3'. The arm 62 comprises two sections connected at their outer ends for movement as a unit by a web 63 (see Fig. 8), the sections of the arm being spaced to form between them a slot 62a through which the cutter 13 operates to sever the work A. In this arrangement it will be noted that the work A is clamped to the slide at opposite sides of the cutter. The outer side wall of the standard 60 is thickened to form a hollow boss 64 in which is fixedly mounted an internally threaded tube 65 forming a nut for a screw 66. The upper end of the screw is pivotally and rotatably connected to the outer end of the arm 62 (as later set forth), so that when the screw 66 moves endwise, by a rotary movement thereof, the arm 62 is swung downwardly to effect a clamping of the jaws against the work A or swung upwardly to release the latter. To effect rotation of the screw 66 I provide on its lower end an arm 67 preferably carrying on its free end a roller 68, arranged to engage a cam 69. A spring 67a connected at one end to a lug 67b on the hub of the arm 67 and adjustably connected at its other end by means of a screw 67c to a bracket 67' suitably supported on the slide 7, serves normally to maintain the arm 67 in the position shown in Figs. 2a, 7 and 8, in which position the movable jaw 61a is raised to permit projection or feeding of the work A between the jaws. As shown in Fig. 2a the cam 69 is provided at its opposite ends with cam portions 69a, 69b, which operate to swing the arm 67 in the following manner: in the forward movement of the slide 7, the cam portion 69a swings the arm 67 to the position a as shown in Fig. 2a in opposition to the tension of the spring 67a, thereby rotating the screw 66 in the direction to move it downwardly and effect engagement of the jaws with the work A, the cam 69 serving to maintain the arm 67 in this position until, in the forward movement of the slide 7, the roller 68 rides beyond the cam portion 69b, following which the spring 67a swings the arm 67 to normal position (indicated at b in Fig. 2a), thereby rotating the screw in the opposite direction to move it endwise upwardly and release the jaws 61, 61a, from the work A. In the return movement of the slide 7, the roller 68 engages the cam portion 69b and swings the arm 67 to the position c (Fig. 2a), to permit the arm 67 to ride the cam in the return movement of the slide and be positioned ready for the next forward movement of the slide 7.

The pivotal and rotatable connection between the upper end of the screw 66 and outer end of the jaw carrying arm 62 preferably consists of the following: 70 indicates a box or housing integrally connected to the outer end of the arm 62. The bottom wall of the box 70 is formed with an opening 71 somewhat larger than the upper end portion of the screw 66 so that the latter loosely extends through the opening; the free end of the screw engaging a plate or cover 72 for the box and acting therethrough to raise the arm 62 when the screw 66 is rotated in the direction to move it endwise upwardly. The end of the screw 66 carries a nut 73 which engages a washer 74 to form a support for one race of anti-friction thrust bearing 75, the other race being fixed to the end portion of the screw and having a spherical lower wall which engages a correspondingly shaped annulus 76 mounted on the bottom wall of the box 70. The parts just described are disposed between and in engagement with the bottom wall of the box and its cover 72 so that endwise movement of the screw serves to move the arm upwardly and downwardly and also permits the screw to rotate and pivot relative to these walls.

The slide 7 is moved forwardly at predetermined intervals dependent upon the length of each section to be severed from the work as the latter feeds forwardly. To insure this operation, the forward end of the moving work operates a trip mechanism which controls a releasing and resetting mechanism for the operating or driving means for the slide to move it forwardly and rearwardly and the slide in turn effects operation of the clamping jaws and movement of the cutter as already set forth, so that each forward end of the work resulting from the severing of the succeeding sections therefrom is effective to carry out a cutting operation and to cut the work into sections of uniform length. For this purpose, I provide the following: 77 is an angle supported at its inner end by a bracket 77a mounted on the frame 5 and extending in a direction parallel to the direction of movement of the work a distance substantially equal to the longest section of the work that may be desired. 78 is a plate adjustably fixed to one side of the angle 77 and forming a support for a shaft 79 on which is fixed a wing 80 normally disposed in an inclined position in the path of movement of the work end, as shown in Fig. 1, and arranged to be operated thereby about the axis of the shaft 79 (clockwise as viewed in Fig. 8a) as the work feeds forwardly. The shaft 79 is provided with an arm 81 which is pivoted to a clamp 82. The clamp 82 is adjustably connected to a rod 88, which in turn is operatively connected to the releasing and resetting mechanism for the dog 33. The movement of the rod 88 endwise by the arm 81 serves to operate the releasing and resetting mechanism, as later set forth. The rod 88 extends outwardly a distance substantially equal to that of the angle 77 so that the clamp 82 may be adjusted along the rod corresponding to the adjustment of the plate 78.

The rod 88 is connected to one arm of a lever 91 pivoted on the frame 5, the other arm of the lever being connected by a link 91' to a rocker 92 fixed to the shaft 34. The function of the link 91' which forms part of the resetting means will be later described. The lever 91 has fixed to it a detent or pawl 93 (a) arranged to engage a notch 93a provided on the free end of the rocker 92 to hold the latter against movement under the influence of a spring 92' connected to the tail of the rocker, with the dog 33 in engagement with the shoulder 33a of the clutch 32, but (b) arranged to disengage or trip the rocker 92 when the rod 88 is moved endwise. Accordingly, when the rod 88 is moved endwise (toward the left in Fig. 1) the rocker 92 is tripped and under the influence of the spring 92' rotates the shaft 34 which in turn releases the dog 33 from the clutch 32 and permits the later to operate, the clutch in turn serving to drive the sprockets 36 and 38 and the latter operating through the linkage 49 to move the slide 7 forwardly and rearwardly as already set forth. The spring 92' serves normally to swing the rocker 92 to its operated position but permits it to be re-set by cam operated means consisting of the following: 93x indicates a link connected at one end to the tail of the rocker 92 and connected at its other end to one end of a lever 94 fulcrumed on the frame 5. The opposite end of the lever 94 supports a roller 95, which is engaged and controlled by a cam 96 fixed to the outer wall of the drum 40. The cam 96 is arranged to operate the lever 94 in the return movement of the slide 7 as it approaches the end of its movement, and through the lever 94 and the link 93x, to swing the outer end of the rocker 92 slightly beyond its set position (it being noted that during this operation the dog 33 is riding the concentric portion of the cam 33b) and the rocker 92 in turn, through the link 91' operates to swing the lever 91 clockwise, as viewed in Fig. 1, to thereby cause the detent 93 to swing into operative relation to the notch 93a, and then, following the disengagement of the cam 96 from the roller 95, the spring 92' swings the rocker 92 in the opposite direction thereby effecting a locked relation between detent 93 and rocker 92 with the dog 33 in engagement with the shoulder 33a of the driven clutch element to stop the later. Following the re-setting of the rocker 92 and disengagement of the cam 96 from the roller 95, the brake controlling cam 40a, which is co-ordinately related to the cam 96, operates the brake 41 to arrest further movement of the shaft 39 and parts operated thereby and to relieve strain on the driving means due to the stopping of the clutch 32.

Due to the fact that the wing 80 is connected through the arm 81 and rod 88, lever 91 and link 91' to the rocker 92, (a) movement of the latter by the cam 96 will swing the wing 80 in the opposite direction (counter-clockwise as viewed in Fig. 3a) beyond its normal position, the effect of which is to discharge the severed section of the work and (b) movement of the rocker 92 under the influence of the spring 92' to its locked or set position will swing the wing 80 to its normal position.

From the foregoing description it will be noted that while the end of the formed material controls the operation of the releasing and re-setting mechanism and through it the operation of the slide, that very little pressure is required to release the rocker 92, so that substantially no strains are imparted to the material and accordingly danger of material which may be of light gauge or because of its specific cross sectional shape, being damaged, distorted or buckled, is eliminated.

83 indicates a sprocket loosely mounted on a shaft carried by a plate 84 and having engagement with the chain 37. The plate 84 is adjustably fixed by bolts 84a to a base 85 suitably mounted on the frame 5 (see Fig. 1). The base 85 is provided with a hollow boss which is internally threaded to receive a screw 86. The free end of the screw is rotatably connected to the plate 84 so that by turning the screw, upon the release of the bolts 84a, the plate 84 may be adjusted, such adjustment being for the purpose of taking up slack in the chain 37.

It will be noted that the cams 20, 69a and 69b are in coordinated relation so that in the forward movement of the slide 7, the work is first clamped between the jaws 61, 61a, next, the cutter is operated to sever the work and thereafter the jaws are released from the work.

To those skilled in the art to which my invention relates, many changes in construction and widely differing embodiments and applications of the invention will suggest themselves without departing from the spirit and scope of the invention. My description and the disclosures herein are purely illustrative and are not intended to be in any sense limiting.

What I claim is:

1. In apparatus of the class described, the combination with a support, power means including a clutch and means for continuously supplying work, of a reciprocatable slide mounted on said support, means arranged to be connected to and disconnected from said power means for reciprocating said slide, means for connecting said reciprocating means to said power means and disconnecting it therefrom, the last said means including an element disposed in the path of movement of the work and operated thereby to connect said reciprocating means to the driven element of said clutch and elements to disconnect said reciprocating means from the driven element of said clutch and re-set said first mentioned element, means carried by said slide for cutting the work during movement therewith, and means between said slide and said support and operated by the movement of the slide independently of said cutting means, for clamping the work to said slide in advance of the operation of said cutting means.

2. In apparatus of the class described, the combination with power means and means for continuously supplying work, of a reciprocatable slide, means arranged to be connected to and disconnected from said power means for reciprocating said slide, means for connecting said reciprocating means to said power means and disconnecting it therefrom, the last said means including two levers, a link for connecting the levers together, a pawl carried by one lever arranged to have interlocked engagement with the other lever, an element operatively connected to the pawl carrying lever and disposed in the path of movement of the work and operated by the latter to release the pawl from the other lever, a cam on a driven element of said reciprocating means, means connected to said other lever arranged to be operated by said cam to re-set said levers and permit said pawl to engage said other lever, and means carried by said slide for cutting the work during movement therewith.

3. In apparatus of the class described, the combination with a support, power means including a clutch having an element which is driven thereby and means for continuously supplying material, of a slide mounted to reciprocate on said support, a rotatable member arranged to be drivingly connected to said driven element and disconnected therefrom, a pitman connected at one end to said slide, connections comprising a crank and linkage each connected to said rotatable member and pitman and co-operating to move said slide at substantially uniform speed with the work, a cutter and power means therefor mounted on said slide, co-acting means between said support and cutter for operating the latter at a predetermined position of the slide in the forward movement thereof, work clamping devices on said slide, co-acting means between said support and said devices for operating said devices in the forward movement of the slide first at a predetermined position of said slide in advance of the operation of the cutter and thereafter at another predetermined position of said slide, and means for connecting said driven element of the clutch to said rotatable member, said means including an element disposed in the path of movement of the work and arranged to be operated thereby.

4. An apparatus as claimed in claim 3 wherein one of the said elements between said rotatable member and said pitman is adjustably connected to the latter.

5. In apparatus of the class described, the combination with a support, power means including a clutch having an element which is driven thereby and means for continuously supplying material, of a slide mounted to reciprocate on said support, a rotatable member arranged to be drivingly connected to said driven element and disconnected therefrom, a pitman connected at one end to said slide, connections comprising a crank and linkage each connected to said rotatable member and pitman and co-operating to move said slide at substantially uniform speed with the work, a cutter and power means thereof mounted on said slide, co-acting means between said support and cutter for operating the latter at a predetermined position of the s'ide in the forward movement therefor, work clamping devices on said slide, co-acting means between said support and said devices for operating said devices in the forward movement of the slide first at a predetermined position of said slide in advance of the operation of the cutter and thereafter at another predetermined position of said slide, means for connecting said driven element of the clutch to said rotatable member, said means including an operating element disposed in the path of movement of the work and arranged to be operated thereby, spring tension means connected to said last mentioned connecting means and normally tending to re-set said operating element in normal position, and means controlled by said rotatable member for controlling the return of said operating element under the influence of said spring tension means.

6. In apparatus of the class described, the combination with a support, power means including a clutch having an element which is driven thereby and means for continuously supplying material, of a slide mounted to reciprocate on said support, a rotatable member arranged to be drivingly connected to said driven element and disconnected therefrom, a pitman connected at one end to said slide, connections comprising a crank and linkage each connected to said rotatable member and pitman and co-operating to move said slide at substantially uniform speed with the work, a cutter and power means therefor mounted on said slide, co-acting means between said support and cutter for operating the latter at a predetermined position of the slide in the forward movement thereof, work clamping devices on said slide, co-acting means between said support and said devices for operating said devices in the forward movement of the slide first at a predetermined position of said slide in advance of the operation of the cutter and thereafter at another predetermined position of said slide, and means for connecting said driven element of the clutch to said rotatable member, said means including an operating element disposed in the path of movement of the work and arranged to be operated thereby, and a pair of levers, one connected to said operating element and provided with a dog and arranged to interlock with the other lever and the other lever being arranged to connect said member to said clutch element, a link connecting said levers together and a spring connected to the said other lever and normally tending to return said levers to normal position.

7. In apparatus of the class described, the combination with power means, including a clutch and means for continuously supplying work, of a reciprocatable slide, means arranged to be connected to and disconnected from said power means, for reciprocating said slide, means for connecting said reciprocating means to said power means and disconnecting it therefrom, the last said means including an element disposed in the path of movement of the work and operated thereby to connect said reciprocating means to the driven element of said clutch and elements to disconnect said reciprocating means from the driven element of said clutch and re-set said first mentioned element, and said first mentioned element being arranged, in its re-setting operation, to discharge the severed section of the work.

8. In apparatus of the class described, the combination with power means, including a clutch, and means for continuously supplying work, of a reciprocatable slide, a member arranged to be drivingly connected to and disconnected from the driven element of said clutch, connections between said member and said slide for reciprocating said slide, means for connecting said member to the driven element of said clutch and disconnecting it therefrom, the last said means including an element disposed in the path of movement of the work and operated thereby to connect said member to the driven element of said clutch and an element carried by said member for controlling the re-setting of said first mentioned element, and means carried by said slide for cutting the work during movement therewith.

HOWARD I. MORRIS.